United States Patent [19]
Albertson

[11] 3,800,896

[45] Apr. 2, 1974

[54] SHOCK ABSORBER MOUNT FOR VEHICLES WITH SKIS

[75] Inventor: Robert V. Albertson, Minneapolis, Minn.

[73] Assignee: Zeal Corporation, Excelsior, Minn.

[22] Filed: Apr. 19, 1973

[21] Appl. No.: 352,676

Related U.S. Application Data

[62] Division of Ser. No. 888,196, Dec. 4, 1969.

[52] U.S. Cl.............. 180/5 R, 244/108, 267/18, 267/32, 280/25
[51] Int. Cl.................. B62m 27/02, B62b 17/04
[58] Field of Search............ 180/5 R, 6, 3, 4; 280/21 R, 25, 26; 267/32, 54, 24, 17, 18; 244/108

[56] References Cited
UNITED STATES PATENTS

| | | | |
|---|---|---|---|
| 1,448,904 | 3/1923 | Sprague | 267/54 |
| 3,623,564 | 11/1971 | Higginbotham | 180/5 R |
| 1,891,188 | 12/1932 | Stalb | 244/108 |
| 1,892,064 | 12/1932 | Markey | 244/108 |
| 3,613,812 | 10/1971 | Hetteen | 280/26 |

*Primary Examiner*—Richard J. Johnson

[57] ABSTRACT

A shock absorber mount for vehicles with skis wherein the shock absorber is so attached to the springs and skis that normal shock absorber action is possible.

4 Claims, 10 Drawing Figures

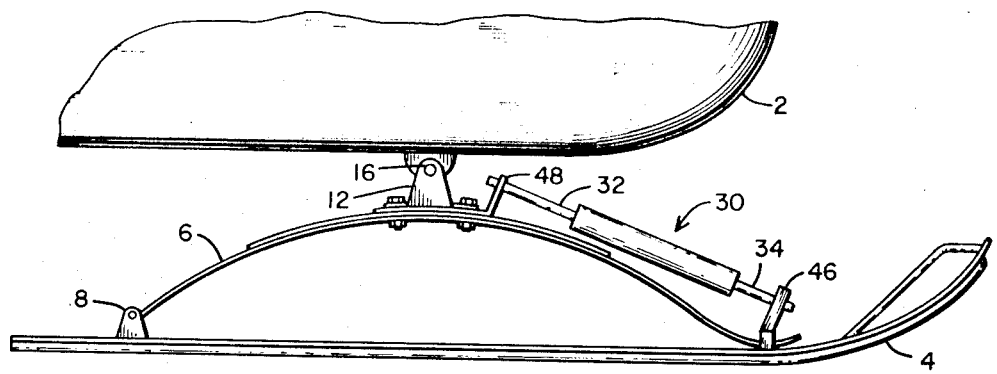
Fig. 5
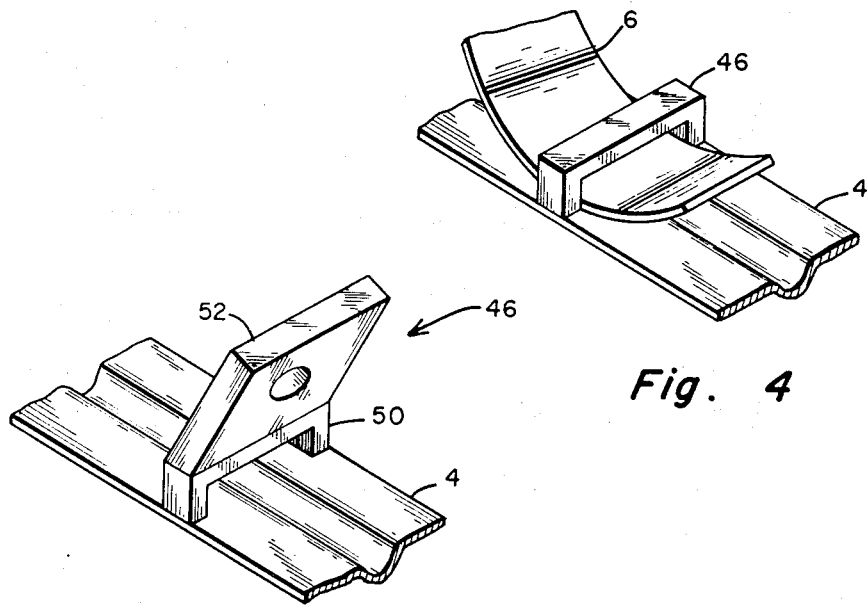
Fig. 4
Fig. 6

SHOCK ABSORBER MOUNT FOR VEHICLES WITH SKIS

This is a division, of application Ser. No. 888,196, filed Dec. 4, 1969.

BACKGROUND OF THE INVENTION

There are in existance today a great number of vehicles such as snowmobiles which have skis for use on snow. Because the snowmobile has met with such success in the market for use of families and individuals, the number and quality of these vehicles are improving each year. Further these vehicles have been improved to the extent that they travel with a great deal of speed. Also, and perhaps in most cases, the vehicles are used over rough, unfamiliar terrain.

This combination of family use, speed and rough terrain has led to a serious problem in that the control of the vehicle at high speeds over rough terrain is impaired. The vehicle has a tendency to bounce under such conditions wherein control may be lost. Further, the bouncing, under the best conditions, is uncomfortable to the riders many of whom, as stated earlier are family members.

SUMMARY OF THE INVENTION

The present invention overcomes the disadvantages of the prior art vehicles having skis in that a shock absorber is mounted between the ski and the vehicle spring to absorb the shock and smooth out the bouncing thereby minimizing the loss-of-control problem.

Thus, it is an object of the present invention to provide a shock absorber for a vehicle with skis.

It is a further object of the present invention to provide a shock absorber for a vehicle with skis wherein the shock absorber is mounted under the spring and on the ski with one end attached to the ski and the other end attached to the spring.

It is still a further object of the present invention to provide a shock absorber for a vehicle with skis wherein the shock absorber is mounted on top of the spring with one end attached to the spring and the other end attached to the ski.

BRIEF DESCRIPTION OF THE DRAWINGS

These and other more detailed and specific objectives will be disclosed in the course of the following specification, reference being had to the accompanying drawings in which:

FIG. 4 discloses the details of a device for holding a spring unit in place relative to the ski unit;

FIG. 5 discloses a second embodiment of the present invention wherein the shock absorber unit is mounted on top of the spring unit with one end being attached to the spring unit and the other end being rigidly attached to the ski element;

FIG. 6 is a detailed drawing of a spring mount to be used with the embodiment of FIG. 5;

DESCRIPTION OF THE PREFERRED EMBODIMENTS

Figure 1:
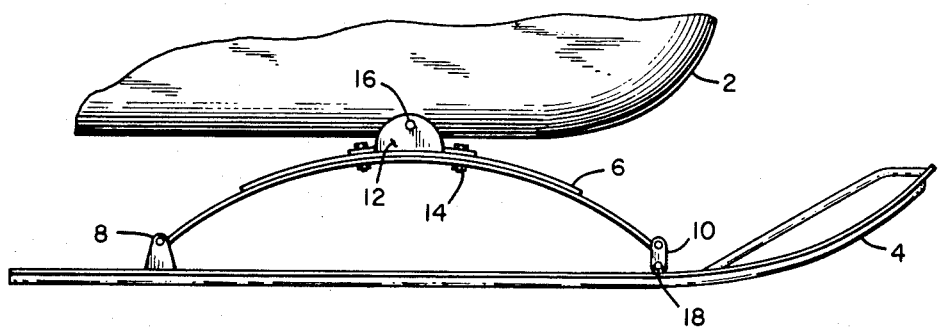
FIG. 1 discloses the prior art vehicle with skis which do not have a shock absorber.

The manner in which the prior art vehicles are attached to skis through a spring mechanism is shown in FIG. 1. Here vehicle 2, only a portion of which is shown, is attached to ski 4 through spring unit 6. Spring unit 6 may be a leaf spring or any similar type spring which is rigidly fastened to a rear support 8 and pivotly attached to a forward support unit 10. A vehicle mount 12 is attached via bolts 14 or other means to the top of spring 6 and is bolted or otherwise attached to vehicle 2 via attachment point 16. When the vehicle strikes a rough spot, the weight of vehicle 2 compresses spring unit 6. Because spring unit 6 is attached to a rigid rear mount 8, and because forward mount 10 is pivotly attached to ski 4, the compression of spring unit 6 causes the forward part of spring unit 6 to move towards the front of the ski or the direction of travel of the vehicle causing forward mount 10 to pivot about point 18. When the spring unit 6 has compressed sufficiently to absorb the shock of the weight of vehicle 2, it begins to return to its normal position with forward mount 10 returning to its normal position by pivoting about point 18.

Figure 2:
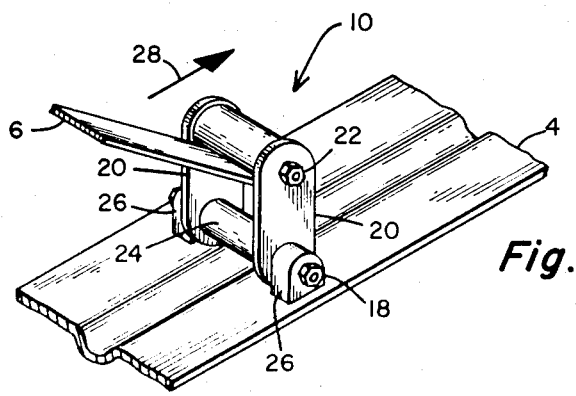
FIG. 2 discloses the details of the hinge device which fastens the spring unit to the ski element.

FIG. 2 discloses the details of forward mount 10. It is one of several well known types in the prior art and is comprised of parallel arms 20 held in spaced relationship by bolt 22 and hollow cylindrical spacer 24. Hollow cylindrical spacers 26 are welded to the ski unit 4 and bolt 18 inserted through the hollow spacer 24 and welded extensions 26. The bolt is made secure with a well known locking means such as a cotter key. Thus, arms 20 are pivotable about bolt 18. Spring unit 6 is attached to upper spacing bolt 22 by having the end of the spring unit constructed in such manner as to form a hollow cylinder. Bolt 22 may then be inserted through arms 20 and the hollow cylindrical end of spring unit 6 and fastened again by a well known locking means such as a cotter key. Thus, spring unit 6 is also movable about bolt 22.

It can thus be seen that as spring unit 6 is compressed and the forward end thereof is caused to move in a direction indicated by arrow 28, arms 20 move forward in the direction of the arrow by pivoting about bolt 18.

Figure 3:
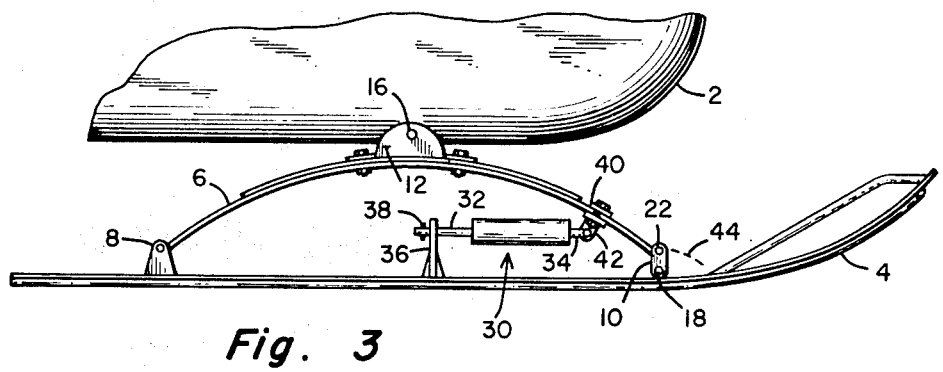
FIG. 3 discloses the preferred embodiment of the present invention wherein a shock absorber unit is mounted under the spring and on the ski element with one end rigidly attached to the ski element and the other end rigidly attached to the spring unit.

FIG. 3 discloses the preferred embodiment of the present invention which provides a shock absorber attachment between the spring unit and the ski element to smooth out the bouncing thereby minimizing the loss of control problem. Again it can be seen that vehicle 2 is attached to ski element 4 via spring unit 6. Spring unit 6 is again attached to vehicle 2 by mount 12 at attachment point 16. Further spring unit 6 is attached to rigid rear mount 8 and pivoting forward mount 10, the action of which has already been described. Shock absorber 30 which is mounted between spring unit 6 and ski element 4 is a standard and well known type having a rear stationary arm 32 and a movable forward arm 34. Rear stationary arm 32 of shock absorber 30 is attached in any well known manner to rigid stationary mount member 36. Mount member 36 is welded or otherwise attached in a rigid position to ski element 4. A locking device such as cotter key 38 may secure arm 32 to rigid mount 36. Bracket 40 is attached by bolts or in any other well known manner to spring unit 6 and has mount 42 formed as a part thereof. Bracket 40 is mounted on spring unit 6 in such a location that mount 42 is in alignment with forward arm 34 of shock absorber 30 whereby forward arm 34 may be attached to said mount 42.

Consider now the operation of shock absorber 30 when spring unit 6 is compressed. Whenever ski element 4 is submitted to an abrupt shock thus causing vehicle 2 to compress spring unit 6, forward mount 10 pivots about point 18 with the upper portion 22 to which spring unit 6 is attached moving along an arc designated by the numeral 44. The distance along this arc which forward mount 10 moves, is dependent upon the amount of shock encountered by the ski element 4. Obviously, as the upper portion 22 of mount 10 begins to move along arc 44, bracket 40 and its attached mount 42 move in a forward direction likewise. Since movable arm 34 of shock absorber 30 is attached at the end thereof to mount 42, movable arm 34 is extended from the shock absorber 30. As is well known with shock absorbers, the movable arm will move very easy in one direction and with extreme resistance in the opposite direction. In the present case, movable arm 34 extends easily and, therefore, follows mount 42 of bracket 40 as the spring is compressed. However, when spring unit 6 has been compressed sufficiently to absorb the shock, it tries to return to its normal position. However, this time movable arm 34 of shock absorber 30 resists the return motion and returns slowly to its normal position, thereby smoothing out the bouncing and minimizing the loss of control problem.

FIG. 4 discloses a second arrangement whereby a spring unit may be attached to a ski element. In FIG. 4, ski element 4 has a C shaped bracket 46 attached thereto by means of welding or any other well known means and the spring unit 6 is placed under bracket 46 and has its end curved in an upward direction sufficiently to prevent the spring unit 6 from sliding out from under bracket 46. If this type of mounting bracket is utilized, a different manner of mounting the shock absorber is required.

FIG. 5 discloses the manner in which the shock absorber is mounted between the ski element 4 and the spring unit 6 wherein the mount of FIG. 4 is utilized. As shown in FIG. 5, spring unit 6 is attached to vehicle 2 by means of mount 12 having thereon attachment point 16. Spring unit 6 is attached to ski element 4 by means of rigid rear mount 8 and forward mounting bracket 46. As the weight of vehicle 2 compresses spring 6, the forward portion thereof slides under bracket 46. Shock absorbers 30 in FIG. 5 has its forward end 34 attached to an extended portion of bracket 46 and its rear arm 32 which is stationary attached to rigid bracket 48. Bracket 48 is attached to the spring unit 6 in any well known manner but can be mounted by bolts or otherwise well known means by sliding an extended portion thereof under mount 12. Therefore, bracket 48 is held in place by mount 12 which is bolted to spring unit 6.

When any sudden shock causes the weight of vehicle 2 to compress spring 6 and the forward end thereof slides under bracket 46, shock absorber 30 is caused to be compressed or moved up on movable arm 34. In this case, the shock absorber is so designed that compression of the movable arm 34 is relatively easy while extension of arm 34 is difficult. In this case then, compression of spring 6 causes compression of movable arm 34 into shock absorber 30. When the spring unit 6 has been compressed to a point equal to the shock it has received, it attempts to return to its normal shape. This time, however, movable arm 34 moves with extreme difficulty and thereby absorbs the bounce or shock which causes loss of control of the vehicle.

Shock absorber 30 shown in FIG. 5 can be mounted such that the movable arm 34 and stationary arm 32 are in reversed positions. Thus, in that case, the shock absorber would have to be designed such that it could compress very easily but extend very slowly. Obviously, the same relationship could take place in FIG. 3 and the shock absorber there reversed in its position. Again, however, in that case, the movable arm 34 of the shock absorber 30 would have to extend very easily and be compressed with great difficulty. Thus a different shock absorber must be used in the manner shown in FIG. 3 than the shock absorber which is used in the manner shown in FIG. 5. In one case, the movable arm must extend very easily and compress with great difficulty while in the other case, the movable arm must compress very easily but extend with great difficulty.

The details of mounting bracket 46 are shown in FIG. 6. The lower portion 50 is C-shaped and identical with bracket 46 shown in FIG. 4, and is attached to ski element 4 as previously disclosed. Thus, welding is one technique sufficient to attach the bottom legs of C-shaped bracket 50 to ski element 4. The upper portion 52 of mounting bracket 46 is attached or integrally formed with lower portion 50 at an angle thereto. This angle should be such as will allow shock absorber 30 to be mounted in a straight line between brackets 46 and 48 as shown in FIG. 5. Obviously, both movable arm 34 and fixed arm 32 are mounted in fixed relationship to their respective brackets 46 and 48.

The invention as previously described functions well where the spring unit is of a size to enable sufficient movement of the movable arm to cause proper shock absorber action. However, in small spring units, compression of the spring causes the forward part of the spring unit to move toward the front of the ski only a fraction of an inch which causes the movable arm of the shock absorber to move this same distance. This is not sufficient movement to provide proper action of the shock absorber.

Figure 7:
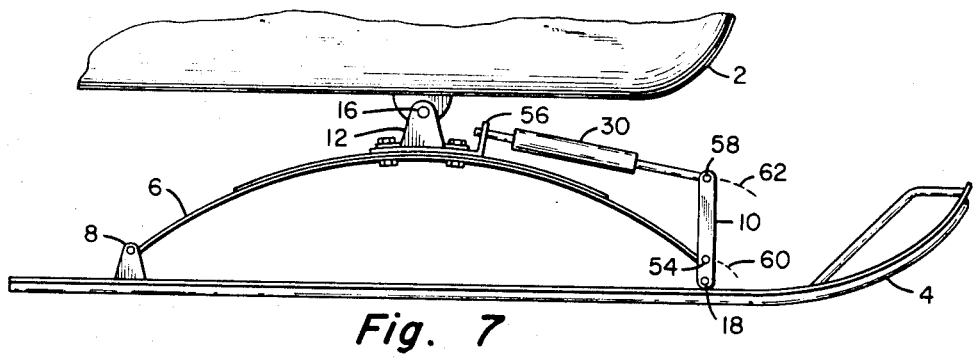
FIG. 7 illustrates the present invention wherein the principle of a lever is used with a spring mount of the type shown in FIG. 2.

In such a case where a spring mount of the type shown in FIG. 2 is used, the principle of the lever action can be used as shown in FIG. 7 to provide sufficient movement of the shock absorber to cause proper shock absorber action.

Again, it can be seen that vehicle 2 is attached to ski element 4 via spring unit 6. Spring unit 6 is again attached to vehicle 2 by mount 12 at attachment point 16. Further, spring unit 6 is attached to rigid rear mount 8 and pivoting forward mount 10. In this case, forward mount 10 pivots about point 18 but is elongated to extend above point 54 at which spring unit 6 attaches. Shock absorber 30 has one arm attached to rigid bracket 56 and the other end attached to the upper portion of forward mount 10 at point 58. As the weight of vehicle 2 compresses spring unit 6, the forward part of spring unit 6 moves toward the front of ski element 4 causing forward mount 10 to pivot about point 18 in a forward direction. Because spring unit 6 connection point 54 on mount 10 is widely separated from the connection point 58 for shock absorber 30, a small movement of point 54 causes a large movement of point 58. Obviously, the further apart points 54 and 58 are located, the greater movement of the shock absorber arm and, thus, the greater the shock absorber action. It can be seen also that the distance between pivot point 18 and spring unit connection point 54 also governs the distance point 58 will move for any given movement of point 54. The ratio of these movements can be expressed by $R_1/R_2$ where $R_1$ = the distance from point 18 to point 58 and $R_2$ = the distance from point 18 to point 54. Thus if $R_1 = 6$ inches and $R_2 = 1$ inch, the ratio will be 6/1 or, in other words, if point 54 moves one-half inch along the arc 60, point 58 will move 3 inches along the arc 62. It can therefore be seen that by utilizing the principle of levers, large amounts of shock absorber arm movement and, thus, proper shock absorber action can be obtained from relatively small forward movements of the forward part of spring unit 6.

Figure 8:
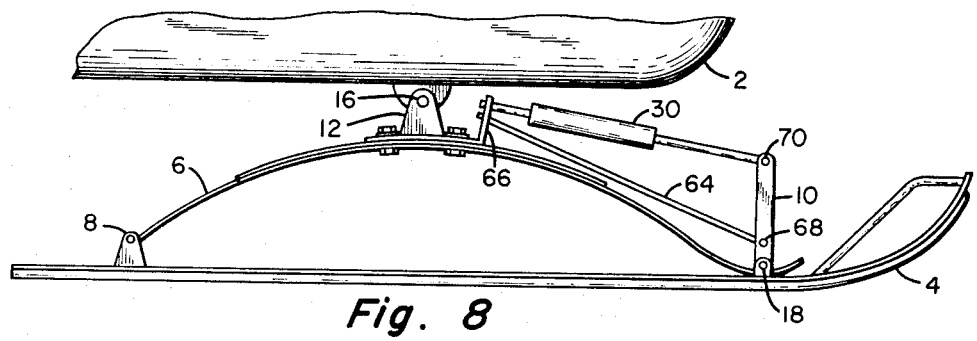
FIG. 8 illustrates the present invention wherein the principle of a lever is used with a spring mount of the type shown in FIG. 4 with a forward pivoting arm.

In the event that a spring mount such as that shown on FIG. 4 is used where the forward end of spring unit 6 merely slides back and forth under a mount, proper shock absorber action through the use of the lever principle can be obtained with the device illustrated in FIG. 8. Here a rod 64 is attached between rear mounting bracket 66 and pivotable forward mount 10 at point 68. Again, shock absorber 30 is attached by one arm to rigid rear mounting bracket 66 and by the other arm to the upper portion of pivotable forward mount 10 at point 70. It can be seen that, as in FIG. 7, when the spring unit 6 is depressed, rod 64 is caused to move in a forward direction a small distance. This small distance is again multiplied by the ratio of the distance between point 18 and point 70 to the distance between point 18 and point 68. Thus, effective shock absorber action is obtained through sufficient travel of the movable shock absorber arm.

Figure 9:
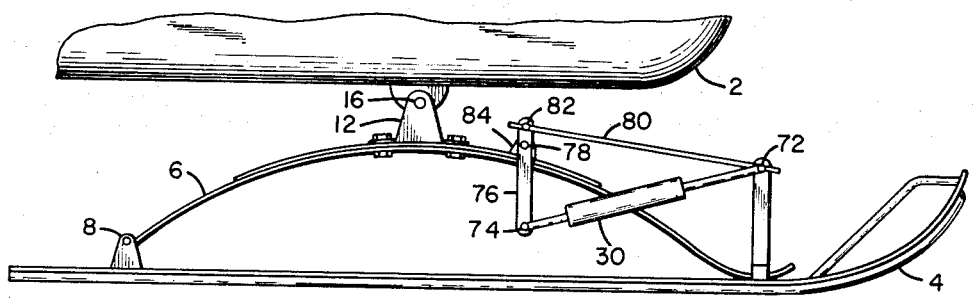
FIG. 9 illustrates the present invention wherein the principle of a lever is used with a spring mount of the type shown in FIG. 4 with a rearward pivoting arm and FIG. 10 illustrates the present invention wherein the principle of a lever is used with a spring mount of the type shown in FIG. 4 with a second type rearward pivoting arm.

FIG. 9 illustrates the principle of the lever to give proper shock absorber action where the forward mount is stationary and the pivotable lever arm is to the rear of the forward mount. Thus, forward mount 10 is rigid while the movable lever arm 76 is pivotally attached to mount 84 which is rigidly affixed to spring unit 6. Shock absorber 30 is attached to forward mount 10 at point 72 and to movable lever arm 76 to point 74. Rod 80 is attached at one end to forward mount 10 at point 72 and at the other end to movable lever arm 76 at point 82. When spring unit 6 is compressed mount 84 tends to move in the forward direction. However, point 82 cannot move forward because of rod 80. Therefore, rod 80 causes point 82 to hold its position while point 78 moves forward. This causes point 74 to which one end of shock absorber 30 is attached to move forward. The distance point 74 will move in the forward direction is a ratio of the distance between points 74 and 78 to the distance between points 78 and 82. Thus a lever arm advantage is obtained and the movement of point 82 with respect to point 78 is multiplied causing point 74 and the attached shock absorber arm to move a sufficient distance to cause proper shock absorber action.

Figure 10:
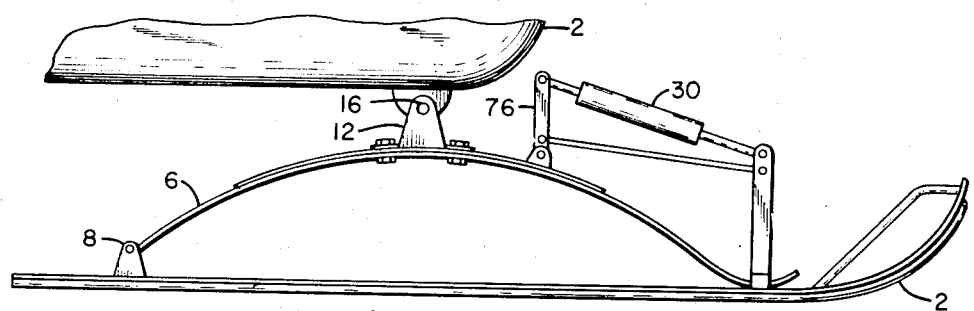

The movable lever arm 76 shown in FIG. 9 can be mounted in the upper position as shown in FIG. 10. From the previous explanation of FIG.'s 7, 8 and 9, it can be seen that proper shock absorber action can be obtained through the device shown in FIG. 10 through the principle of the lever.

Thus, there has been disclosed a novel shock absorber attachment for vehicles having ski elements attached thereto whereby extreme bouncing of the vehicle will be minimized thereby minimizing the tendency to lose control of the vehicle.

It is understood that suitable modification may be made in the structure as disclosed, provided such modifications come within the spirit and scope of the appended claims.

Having now, therefore, fully illustrated and described my invention, what I claim to be new and desire to protect by letters patent is:

1. A shock absorber attachment for a vehicle with a ski element and having a leaf spring unit mounted between said vehicle and said ski element comprising:
   a. a first mount pivotally attached to said ski element and a second mount rigidly attached to said spring unit;
   b. a shock absorber having a movable arm and a stationary arm with one arm coupled to said first mount a distance $R_1$ from the pivot point and the other arm attached to said second mount, and
   c. means coupled between said first and second mounts as a lever arm with one end coupled to said first mount at a point a distance $R_2$ from said pivot point whereby when said spring unit compresses a small forward movement, $x$, of said lever arm causes a large movement, $d$, of said movable shock absorber arm according to the equation $d = x (R_1 \div R_2)$.

2. A shock absorber attachment as in claim 1 wherein said lever arm means comprises:
   a. said spring unit having one end thereof rotatably attached to said first mount at said distance $R_2$.

3. a shock absorber attachment as in claim 1 wherein said lever arm means comprises:
   a. a rod having one end rotatably attached to said first mount at said distance $R_2$ and the other end attached to said second mount.

4. A shock absorber attachment for a vehicle with a ski element and having a leaf spring unit mounted between said vehicle and said ski element comprising:
   a. a first mount rigidly attached to said ski element and a second mount pivotably attached to said spring unit;
   b. a shock absorber having a movable arm and a stationary arm with one arm coupled to said first mount and the other arm coupled to said second mount a distance $R_1$ from the pivot point,
   c. a rod coupled between said first and second mounts as a lever arm with one end coupled to said first mount and the other end rotatably attached to said second mount at a distance $R_2$ from said pivot point whereby when said spring unit compresses, a small forward movement, $x$, of said second mount pivot point causes a large movement, $d$, of said shock absorber arm according to the equation $d=x(R_1/R_2)$.

* * * * *